(No Model.)
J. W. SEIVERT.
PROPELLING WHEEL.
No. 461,547. Patented Oct. 20, 1891.
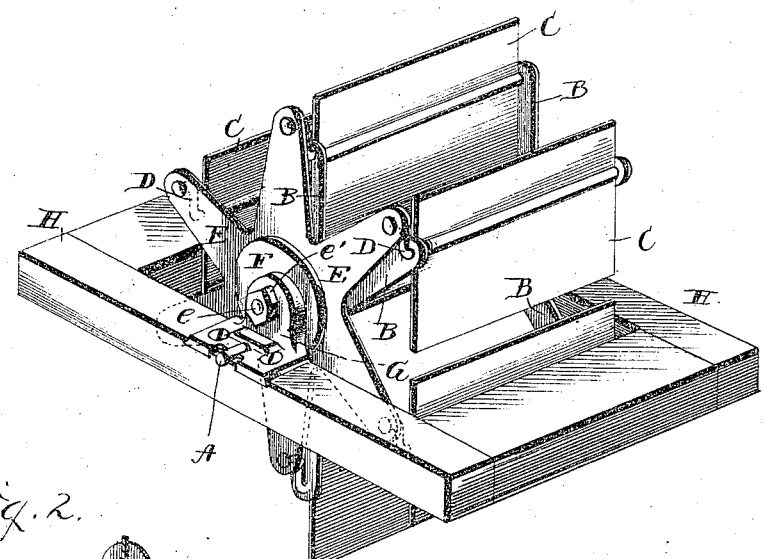
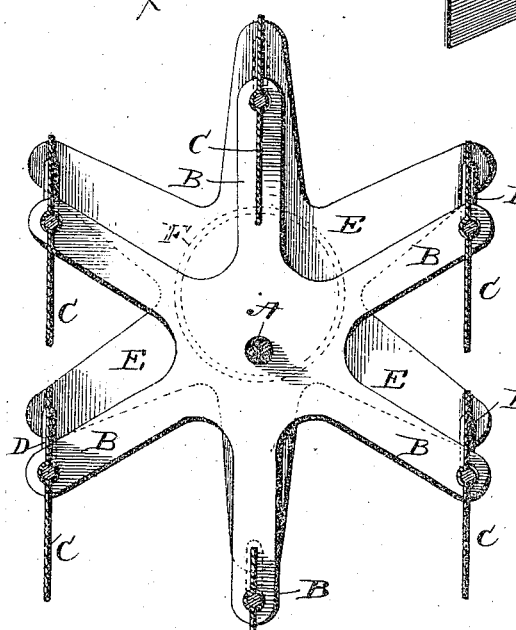
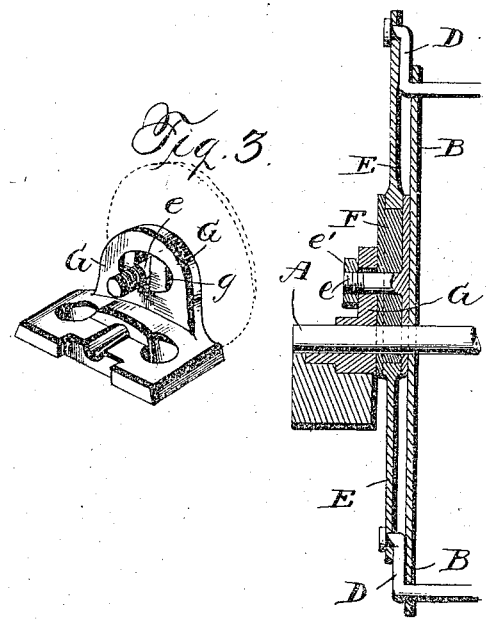
Witnesses
C. J. Williamson
G. M. Copenhaver
Inventor
John W. Seivert
by Franklin H. Hough
his Attorney

UNITED STATES PATENT OFFICE.

JOHN W. SEIVERT, OF MEDICAL LAKE, WASHINGTON.

PROPELLING-WHEEL.

SPECIFICATION forming part of Letters Patent No. 461,547, dated October 20, 1891.

Application filed June 2, 1891. Serial No. 394,875. (No model.)

*To all whom it may concern:*

Be it known that I, JOHN W. SEIVERT, a citizen of the United States, residing at Medical Lake, in the county of Spokane and State of Washington, have invented certain new and useful Improvements in Propelling-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to wheels for propelling vessels and water-craft, and which may be used equally well in a current for driving machinery.

The object of my invention is the construction of a wheel in which the paddles will offer a minimum resistance to the water in entering and leaving the same, and which will perform efficient work from the moment of entrance of the paddles into the water until they leave the same.

Another object of the invention is to hold the paddles in the relative proper position in a positive manner, and to provide means whereby the relative position or angle of the paddles may be changed, so that they may be caused to enter, pass through, and leave the water in a vertical or perpendicular position or at any required angle to the perpendicular.

The improvement consists of the novel features and the peculiar construction and combination of the parts, which will be hereinafter more fully described and claimed, and which are shown in the annexed drawings, in which—

Figure 1 is a perspective view of a propeller-wheel embodying my invention. Fig. 2 is a cross-section of the wheel, taken at right angles to the axes of the paddles. Fig. 3 is a detail view of the plate for controlling the position of the paddles, the support for the said plate which is set eccentrically to the axis of the wheel, and the means for securing the said support in the located position.

The shaft A is provided near each end with arms B, between which the paddles C are supported in the usual manner, being provided with journals which have bearings in the said arms B. The journals of the paddles are projected at one end beyond the arms B and terminate in the cranks D, which have connection with the plate E, that is mounted upon the support F, which is set eccentrically to the axis of the wheel. The support F is adjustable to vary the position of the plate E relative to the arms B, thereby changing the relative position of the paddles C. The plate E is adapted to revolve freely on the support F, and turns with the wheel in the operation of the invention. The bearing G is provided with an opening $g$ sufficiently large to receive the threaded stem $e$ of the support F and allow of a limited adjustment of the same to shift the position of the said support. The nut $e'$ on the stem $e$ binds against the side of the bearing G and holds the support F in the located position.

The paddles present more surface on one side of their axes than on the other. This superior side will be referred to as the "wide" side of the paddles.

The operation of the invention is as follows: The wheel is mounted in any suitable manner, the frame H shown being of ordinary form, and the support F and plate E being adjusted to bring the paddles in a vertical position or at any required angle to the perpendicular. The wheel being rotated, the plate E is caused to turn on the support, and through the cranks D control and maintain the paddles in the proper position. When the wheel is used for propelling purposes, the wide side of the paddles must be lowermost, and for motive power in a current of water the wide side must be uppermost.

Having thus described my invention, what I claim to be new, and desire to secure by Letters Patent, is—

A wheel composed of a shaft, arms near each end of said shaft, a support F, plate E, mounted on said support, which is set eccentrically to the axis of the wheel, said plate adapted to revolve freely on the support, the cranks on the journals of the paddles connected with said plate, the paddles on said journals, means for adjusting said support consisting of a bearing G, having elongated horizontal opening, a threaded stem on the support in said opening, and a nut on the threaded stem binding against the side of the bearing G, which latter forms a bearing for the shaft of the wheel, substantially as and for the purpose described.

In testimony whereof I affix my signature in presence of two witnesses.

JOHN W. SEIVERT.

Witnesses:
CHARLES MAXEN,
GEORGE A. RULAFORD.